United States Patent
Tashiro et al.

(10) Patent No.: US 8,744,712 B2
(45) Date of Patent: Jun. 3, 2014

(54) DRIVE CONTROL DEVICE FOR ELECTRIC VEHICLE, AND ELECTRIC VEHICLE

(75) Inventors: Naoyuki Tashiro, Atsugi (JP); Ryo Inaba, Hitachi (JP); Shinya Sato, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 13/187,554

(22) Filed: Jul. 21, 2011

(65) Prior Publication Data

US 2012/0022735 A1 Jan. 26, 2012

(30) Foreign Application Priority Data

Jul. 23, 2010 (JP) ................... 2010-165730

(51) Int. Cl.
G06F 19/00 (2011.01)
G06F 17/00 (2006.01)
B60T 8/64 (2006.01)

(52) U.S. Cl.
USPC ................. 701/70; 701/22; 303/152

(58) Field of Classification Search
USPC ....................... 701/22, 70; 303/152
See application file for complete search history.

(56) References Cited

U.S. PATENT DOCUMENTS

| | | | |
|---|---|---|---|
| 7,109,686 B2 * | 9/2006 | Schulte et al. | 320/167 |
| 7,273,120 B2 * | 9/2007 | Tabata | 180/65.265 |
| 2006/0176028 A1 * | 8/2006 | Schulte et al. | 320/166 |
| 2006/0231306 A1 * | 10/2006 | Severinsky et al. | 180/65.2 |
| 2008/0125928 A1 * | 5/2008 | Conlon et al. | 701/22 |
| 2008/0223637 A1 * | 9/2008 | Bartilson | 180/65.4 |

FOREIGN PATENT DOCUMENTS

| | | |
|---|---|---|
| JP | 08-079907 | 3/1996 |
| JP | 2000-270414 | 9/2000 |
| JP | 2001-218303 | 8/2001 |
| JP | 2003-174702 | 6/2003 |
| JP | 2008-211861 | 9/2008 |
| JP | 2009-044871 | 2/2009 |

OTHER PUBLICATIONS

Office Action in Japanese Appln. Ser. No. 2010-165730, dispatched Oct. 1, 2013 (in Japanese, 4 pgs.), (English language translation, 6 pgs.).

* cited by examiner

*Primary Examiner* — Behrang Badii
*Assistant Examiner* — Daniel L Greene
(74) *Attorney, Agent, or Firm* — Antonelli, Terry, Stout & Kraus, LLP.

(57) ABSTRACT

A drive control device for an electric vehicle that is driven by a motor-generator, includes: a detection unit that detects a fact that an accelerator pedal depression amount and a brake pedal depression amount of the electric vehicle are both zero; and a control unit that sets a regenerative braking torque command value for the motor-generator to zero, while the detection unit is detecting the fact.

11 Claims, 23 Drawing Sheets

FIG.20 PROBLEMS IN BRAKING DUE TO ACCELERATOR OFF
■ DURING DECELERATION ⇒ RE-ACCELERATION
ENERGY LOSS OCCURS DUE TO CONVERSION OF KINETIC ENERGY TO ELECTRICAL ENERGY
BATTERY ENERGY USED: ENERGY LOSS OCCURS DUE TO CONVERSION TO KINETIC ENERGY
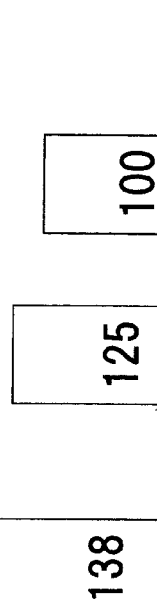
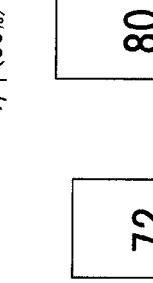
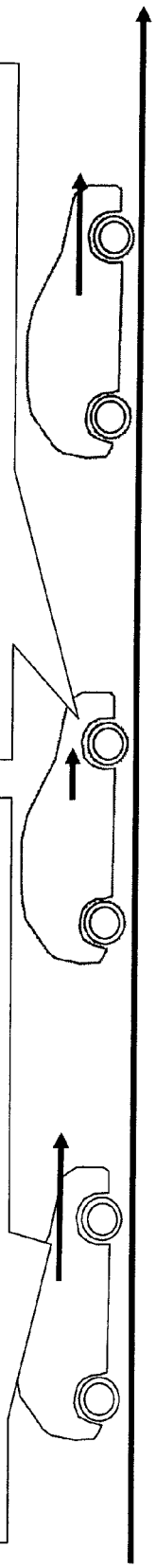

DRIVE CONTROL DEVICE FOR ELECTRIC VEHICLE, AND ELECTRIC VEHICLE

INCORPORATION BY REFERENCE

The disclosure of the following priority application is hereby incorporated herein by reference: Japanese Patent Application No. 2010-165730, filed Jul. 23, 2010.

BACKGROUND OF THE INVENTION

1. Field of the Invention

The present invention relates to a drive control device for an electric vehicle such as a hybrid automobile or an electric automobile or the like, and to an electric vehicle equipped with such a drive control device.

2. Description of Related Art

With a gasoline engine, the drive force needed under various types of driving conditions is obtained by using a transmission, since the torque at low speed is low and the rotational speed region possible for driving is narrow. On the other hand, with an electric motor, it is possible to obtain the necessary drive force without using any transmission, since the torque at low speed is high and the rotational speed region possible for driving is broad. Accordingly, with a typical electric automobile, no transmission is provided, and the output shaft of the electric motor is connected to the drive wheels directly or via a final reduction gear and a differential gear device.

Since with an electric automobile, as compared to a gasoline engined vehicle, it is possible to control the torque at high accuracy and moreover at high speed, accordingly such an automobile never operates in an idling state, as is the case with a gasoline engined vehicle. In other words the driving feeling is different from that of a gasoline engined vehicle, since during deceleration engine braking due to the rotation of the engine is not generated. With the invention disclosed in Japanese Laid-Open Patent Publication 2009-44871, at low speed the torque of an electric motor is controlled so as to generate creep torque simulating the creep torque that is present during operation of a gasoline engined vehicle equipped with an automatic transmission, while at medium and high speed regenerative braking is performed by utilizing the electric motor as a generator, so that braking force is generated corresponding to engine braking. By doing this, while obtaining braking force, it is also possible to recuperate to the battery the electrical power that is generated.

SUMMARY OF THE INVENTION

With the invention disclosed in Japanese Laid-Open Patent Publication 2009-44871, while braking force that corresponds to engine braking is generated at medium and high speed, and the electrical power that is generated is utilized for charging up the battery, the retrieval efficiency of energy of motion to the battery is poor, since the braking force corresponding to engine braking is generated in the operational region of the electric motor in which its efficiency (i.e. its regenerative efficiency) is low. The term "energy of motion (driving energy)" is a way of describing the kinetic energy possessed by the vehicle.

As a result, if the vehicle is decelerated and stopped by performing regeneration corresponding to engine braking while the accelerator pedal is released (this state will be referred to as the accelerator OFF state), then not only is a portion of the energy of motion lost because this regeneration is performed at low efficiency, but also there is the problem that, if after this deceleration the vehicle is again accelerated, then further energy losses are entailed in the electric motor, the power module, and the battery during driving under power.

According to the 1st aspect of the present invention, a drive control device for an electric vehicle that is driven by a motor-generator, comprises: a detection unit that detects a fact that an accelerator pedal depression amount and a brake pedal depression amount of the electric vehicle are both zero; and a control unit that sets a regenerative braking torque command value for the motor-generator to zero, while the detection unit is detecting the fact.

According to the 2nd aspect of the present invention, in the drive control device for an electric vehicle according to the 1st aspect, it is preferred that when a regeneration stopped mode is selected as a first control mode, the control unit sets the regenerative braking torque command value for the motor-generator to zero.

According to the 3rd aspect of the present invention, in the drive control device for an electric vehicle according to the 2nd aspect, it is preferred that the drive control device further comprises a manual mode change over unit that selects the regeneration stopped mode.

According to the 4th aspect of the present invention, in the drive control device for an electric vehicle according to the 2nd aspect, it is preferred that: the drive control device further comprises a determination unit that determines whether or not a maximum possible torque for regeneration of the motor-generator, which is calculated based upon a speed of the electric vehicle, is greater than or equal to a predetermined regeneration stopping threshold value; and the regeneration stopped mode is selected when an affirmative determination output is received from the determination unit.

According to the 5th aspect of the present invention, in the drive control device for an electric vehicle according to any one of the 2nd through 4th aspects, it is preferred that when the regeneration stopped mode is not selected as the first control mode, a second control mode is set in which regeneration torque of the motor-generator is generated when both the accelerator pedal depression amount and the brake pedal depression amount are zero.

According to the 6th aspect of the present invention, in the drive control device for an electric vehicle according to any one of the 2nd through 4th aspects, it is preferred that even if the regeneration stopped mode is selected, the control unit prohibits setting the regenerative braking torque command value for the motor-generator to zero when a speed of the electric vehicle is less than a predetermined threshold value.

According to the 7th aspect of the present invention, in the drive control device for an electric vehicle according to the 4th aspect, it is preferred that even if the regeneration stopped mode is selected, the control unit performs regeneration control at the maximum possible torque for regeneration when the determination unit determines that the maximum possible torque for regeneration is smaller than the predetermined regeneration stopping threshold value.

According to the 8th aspect of the present invention, in the drive control device for an electric vehicle according to the 5th aspect, it is preferred that either one of the first control mode and the second control mode is selected, based upon environmental information obtained from a unit that acquires the environmental information.

According to the 9th aspect of the present invention, in the drive control device for an electric vehicle according to the 7th aspect, it is preferred that the drive control device further comprises a cooling control unit that, when the determination unit determines that the maximum possible torque for regeneration is smaller than the predetermined regeneration stopping threshold value, makes an output of a cooling device greater, the greater is the difference between the maximum possible torque for regeneration and the predetermined regeneration stopping threshold value.

According to the 10th aspect of the present invention, in the drive control device for an electric vehicle according to the 7th aspect, it is preferred that the drive control device further comprises a cooling control unit that, when the determination unit determines that the maximum possible torque for regeneration is smaller than the predetermined regeneration stopping threshold value, raises an output of a cooling device until the maximum possible torque for regeneration becomes greater than or equal to the predetermined regeneration stopping threshold value According to the 11th aspect of the present invention, in the drive control device for an electric vehicle according to any one of the 4th through 10th aspects, it is preferred that the predetermined regeneration stopping threshold value is set within a range of braking torque when a brake pedal is depressed.

According to the 12th aspect of the present invention, in the drive control device for an electric vehicle according to any one of the 4th through 10th aspects, it is preferred that braking torques when a depression amount of a brake pedal is greater than zero are stored, and the predetermined regeneration stopping threshold value is set to a value of braking torque whose frequency of occurrence is high.

According to the 13th aspect of the present invention, in the drive control device for an electric vehicle according to any one of the 4th through 10th aspects, it is preferred that braking torques and corresponding vehicle speeds when a depression amount of a brake pedal is greater than zero are stored, and the predetermined regeneration stopping threshold value is set to a value of braking torque whose frequency of occurrence vehicle speed is high in each of the vehicle speeds.

According to the 14th aspect of the present invention, an electric vehicle comprises a drive control device according to any one of the 1st through 13th aspects.

BRIEF DESCRIPTION OF THE DRAWINGS

FIG. 20 is a figure for explanation of a problematic feature of braking with the accelerator pedal released;

DESCRIPTION OF THE PREFERRED EMBODIMENTS

Embodiments of the present invention will now be explained in detail with reference to the drawings.

The First Embodiment

Figure 1:
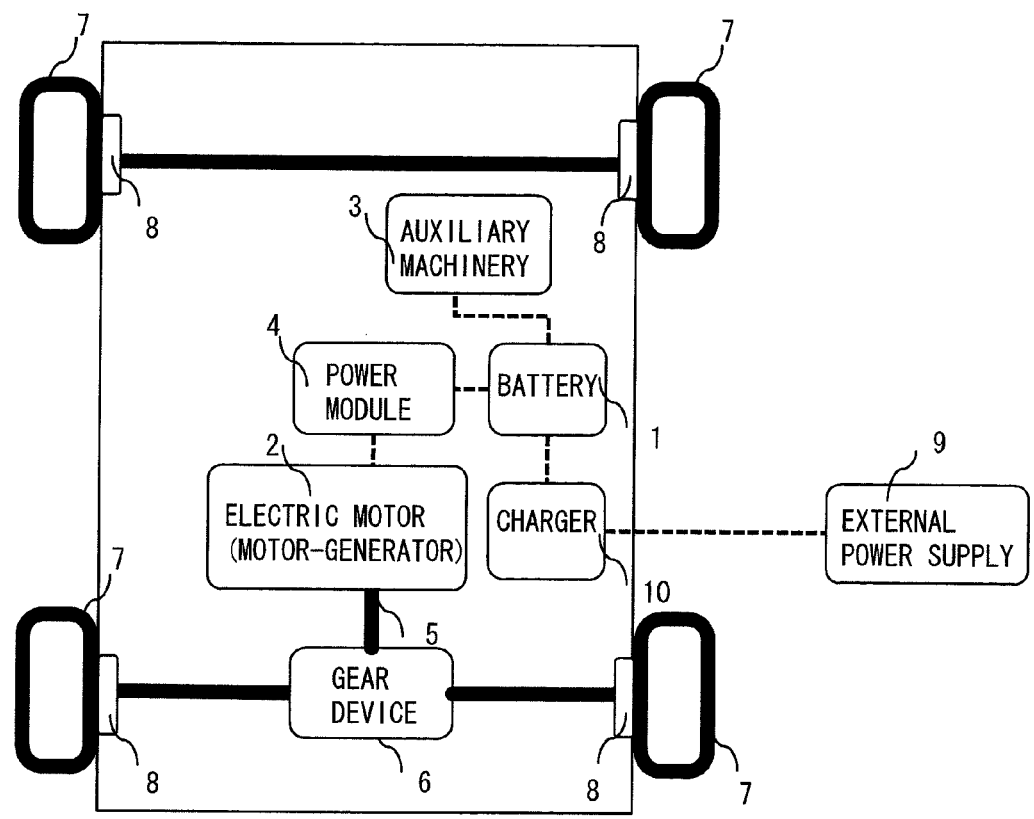
FIG. 1 is a figure showing the overall structure of an electric vehicle to which the present invention is applied.

FIG. 1 is a figure showing the overall structure of an electric vehicle to which the present invention is applied. Driving force for this electric vehicle is generated by electrical power accumulated in a battery 1 being supplied to an electric motor (electric machine) 2, and moreover various auxiliary devices are operated by some of this electrical power being supplied to auxiliary machinery 3. This auxiliary machinery 3 not only includes an air conditioner, a pump, a cooling fan and so on, but also may include accessories of various types, such as a navigation device, an in-vehicle audio system, and so on.

Next, the arrangements for generation of drive force for this electric vehicle will be explained. In order to obtain the desired drive force, it is necessary to control the torque generated by the electric motor 2. In torque control for the electric motor 2, the desired torque is generated by controlling the voltage supplied to the electric motor 2 by a power module 4 (a so-called inverter). Drive force for the vehicle is obtained by the torque generated by the electric motor 2 being transmitted to the vehicle wheels 7 via a drive shaft 5, a gear device 6, and so on.

With an electric vehicle that is equipped with an electric motor 2 (more accurately, a motor/generator, hereafter simply referred to as an electric motor), as methods for generating braking force, there is a method of using mechanical brakes 8, and a method of using the electric motor 2. Mechanical brakes 8, of a type similar to those provided to a vehicle with an internal combustion engine in the prior art, are fitted to the front and rear wheels 7 on both sides of the vehicle, and, when the driver originates a demand for braking, these mechanical brakes 8 are controlled so as to generate appropriate braking force. On the other hand, regenerative braking is a method for generating braking force by using the electric motor 2. When force is applied to the electric motor 2 in the opposite direction to its driving direction, current flows from the motor 2 to the battery 1, and the motor 2 functions as a generator. By controlling the flow to the battery 1 of this electrical power generated by regenerative braking control, it is possible to convert the kinetic energy possessed by the vehicle into electrical energy, and thus to charge the battery 1.

However, the main technique for charging the battery 1 with electrical energy is to supply electrical power from an external power supply 9. If the remaining capacity in the battery 1 of the electric vehicle has become low, then it is possible to supply electrical power from the external power supply 9 by connecting the battery 1 to the external power supply 9 via a charger 10. The charger 10 controls the current supplied to the battery 1 while taking account of the voltage of the external power supply 9, the temperature of the battery 1, the remaining capacity in the battery 1, and so on.

Figure 2:
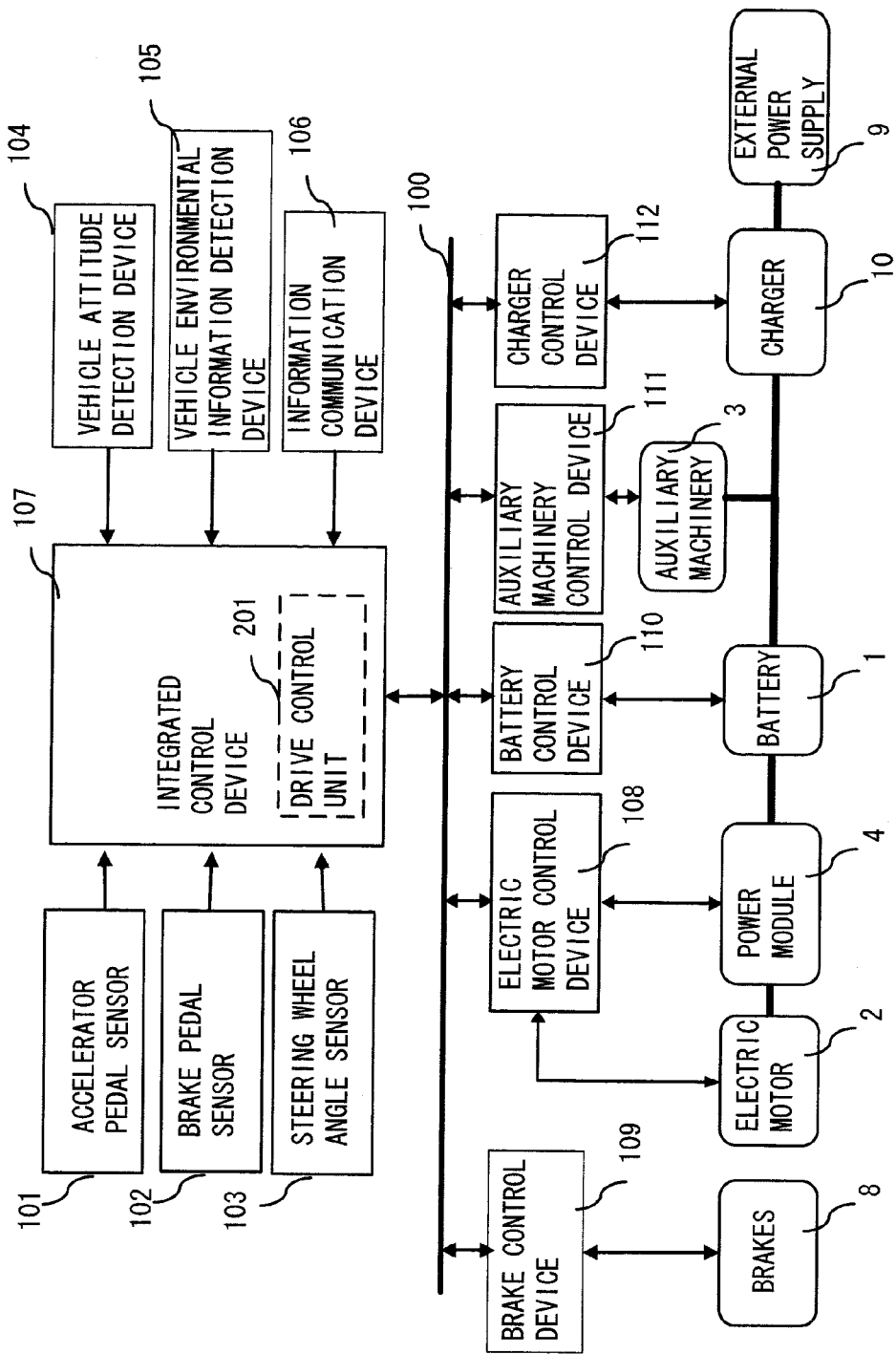
FIG. 2 is a block diagram showing the overall structure of a control system mounted to the electric vehicle shown in FIG. 1.

FIG. 2 is a block diagram showing the overall structure of a control system mounted to the electric vehicle shown in FIG. 1. Control devices are provided for the various devices such as the battery 1, the electric motor 2, the auxiliary machinery 3, the mechanical brakes 8, the charger 10 and so on. With this control system for an electric vehicle, information from the various devices mentioned above, as well as commands from the driver (signals from an accelerator pedal sensor 101, a brake pedal sensor 102, and a steering wheel angle sensor 103) and information obtained from a vehicle attitude detection device 104, a vehicle environmental information detection device 105, and a information communication device 106, are inputted to an integrated control device 107 via a communication line 100. With this integrated control device 107, it becomes possible to travel in safety and moreover with comfort while the vehicle obeys commands from the driver, and command values are transmitted to the various devices described above, so that the devices described above are controlled on the basis of these command values from the integrated control device 107.

The vehicle attitude detection device 104 is a device that detects the force applied to the vehicle body and vehicle body rotational speed and so on. The vehicle environmental information detection device 105 is a device that detects information about vehicles near this vehicle using a camera or radar or the like, and that detects local environmental conditions such as temperature and/or humidity and so on. And the information communication device 106 is a device that acquires traffic information and performs inter-vehicle communication and so on.

The electric motor (motor-generator) control device 108 receives a command value for braking or driving torque from the integrated control device 107, and calculates the current for implementing this braking or driving torque on the basis of the requested braking or driving torque and the rotational speed of the electric motor 2. And the voltage of the power module 4 is controlled so that this calculated current flows to or from the electric motor 2, and thereby the desired braking or driving torque is provided.

Next, the procedure executed by the integrated control device 107 for calculating the braking torque command value will be explained. In order to generate braking torque as described above, since both regenerative braking torque by the electric motor 2 and braking torque by the mechanical brakes 8 can be provided, the command value for braking torque is allocated between a command value to the electric motor 2 for regenerative braking torque and a command value to the mechanical brakes 8 for mechanical braking torque, according to the states of the various devices and the state of the vehicle and so on, Since the energy that is generated due to regenerative braking by the electric motor 2 can be usefully recuperated to the battery 1, accordingly it is preferred to set the amount of braking torque allocated to regenerative braking by the electric motor 2 to be higher than the amount of braking torque allocated to mechanical braking by the mechanical brakes. However sometimes it is the case that, due to considerations related to protection of the various components, it is proper to suppress the flow of current to the battery 1, the electric motor 2, and the power module 4. In other words, it is possible to obtain an appropriate braking torque by allocating the portion of the braking torque that cannot be supplied by braking torque due to regeneration by the electric motor 2, to a control device 109 for the mechanical brakes.

The voltage and the temperature of each of the battery cells or of each of the battery module are detected by a battery control device 110, and this device performs control to suppress voltage variation between the cells or modules, control to limit the current that can be supplied according to the battery temperature, and processing to detect the level of deterioration of the battery. Moreover, in order to prevent over-charging and over-discharging of the battery, the current that flows through the battery is limited according to the remaining capacity of the battery, i.e. according to its SOC (State Of Charge).

An auxiliary machinery control device 111 controls the amounts of electrical power supplied to an air conditioner and to an in-car navigation device and an audio system, these being devices that are started and stopped according to actuation by the driver, as well as the amounts of electrical power supplied to cooling system components that are almost always operating such as a cooling fan and a cooling pump and so on. The temperature and/or the flow rate of the cooling water are controlled by changing the output of the cooling fan and/or the output of the pump according to the temperatures of the various devices. Moreover, if the remaining capacity SOC of the battery has decreased, control is implemented to cut off or to reduce supply of electrical power to those of the electrical systems whose non-operation will not pose any obstacles to vehicle integrity or safety.

A charger control device 112 is connected between the external power supply 9 and the charger 10, and performs control to receive current from an external power supply 9 while taking account of the state of the battery 1.

A drive control unit 201 for performing braking control and driving control is provided to the integrated control device 107. It should be understood that while, in FIG. 2, this drive control unit 201 is shown as being installed to the integrated control device 107, it would also be possible to install this drive control unit 201, not to the integrated control device 107, but rather to the electric motor control device 108. In this case, commands from the integrated control device 107 would be transmitted to the drive control unit 201 via the communication line 100.

Figure 3:
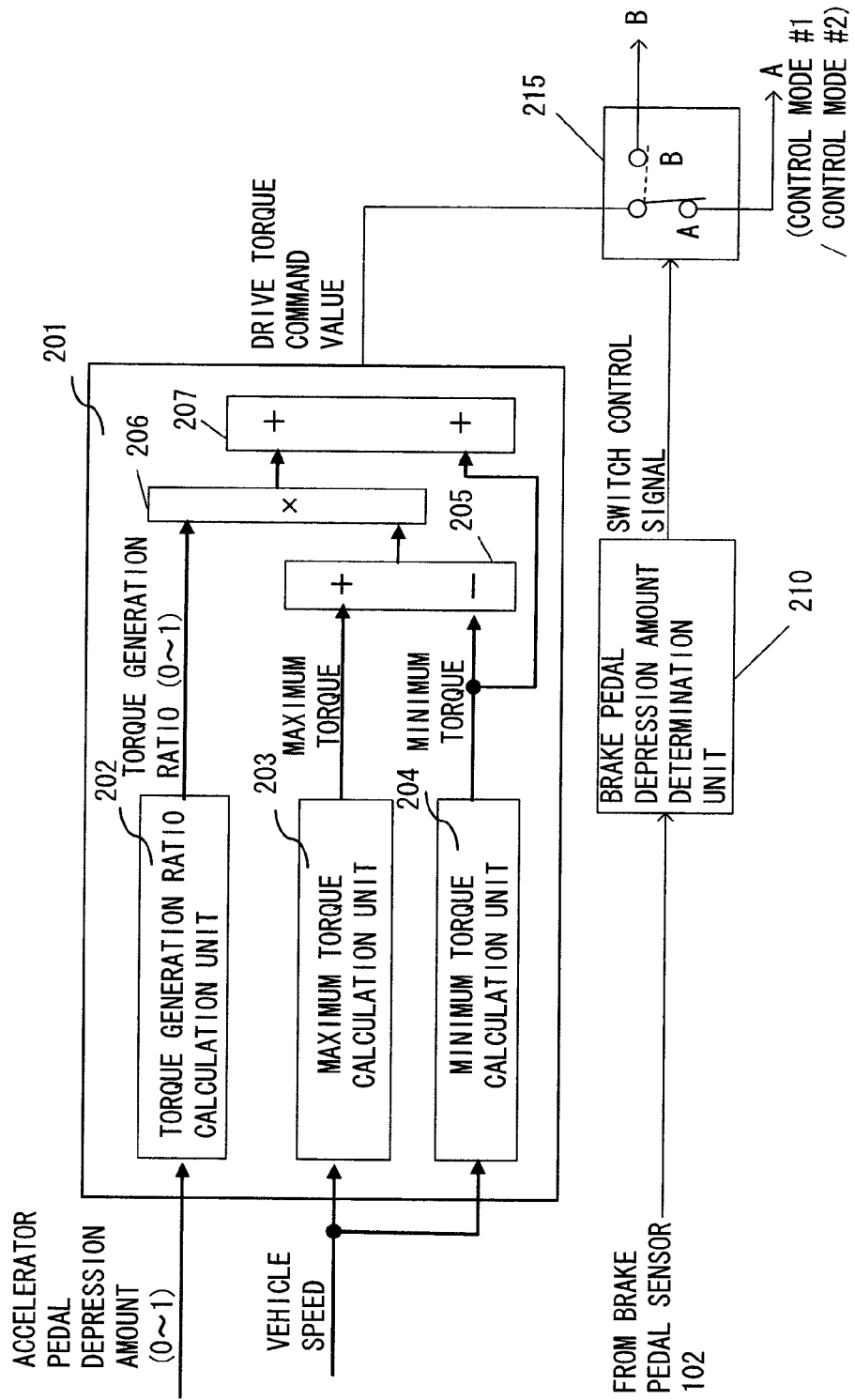
FIG. 3 is a block diagram showing a circuit structure for obtaining a torque command value from a drive control unit 201.
Figure 4:
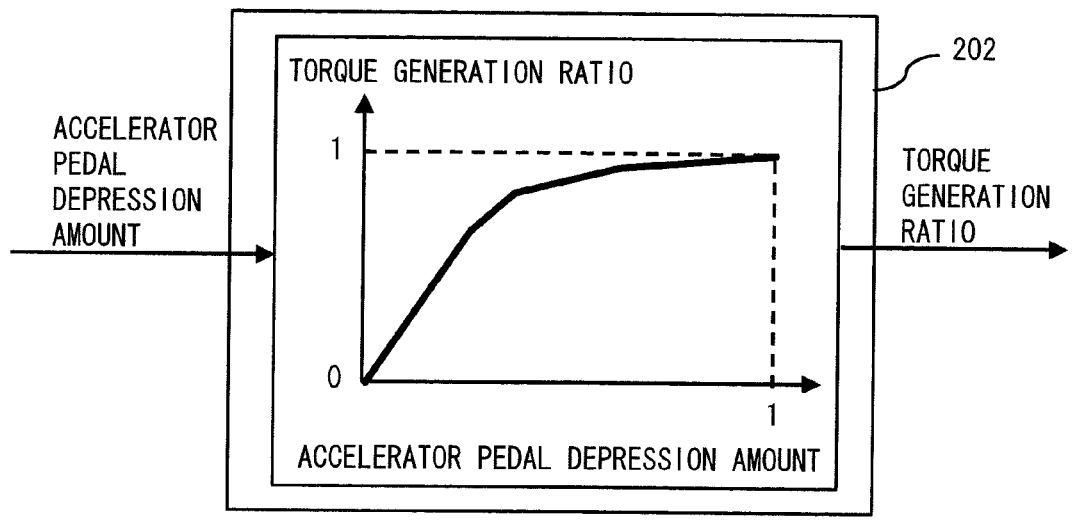
FIG. 4 is a figure showing an example of a correspondence relationship between an accelerator pedal depression amount and a torque generation ratio, held in a torque generation ratio calculation unit 202.

FIG. 3 is a block diagram showing the circuit structure for obtaining a torque command value from the drive control unit 201. This drive control unit 201 includes a torque generation ratio calculation unit 202, a maximum torque calculation unit 203, and a minimum torque calculation unit 204. The torque generation ratio calculation unit 202 calculates a torque generation ratio according to the amount of depression of the accelerator pedal. Here, a signal voltage from the accelerator pedal sensor 101, representing the amount of depression of the accelerator pedal, is converted so that the minimum voltage corresponds to zero while the maximum voltage corresponds to unity (1). Furthermore, the torque generation ratio is a value that is calculated according to the accelerator pedal depression amount, and is set, as shown in FIG. 4, so that when the accelerator pedal depression amount is zero the torque generation ratio is zero, while when the accelerator pedal depression amount is unity the torque generation ratio is unity, and moreover so that, the greater is the amount of accelerator pedal depression, the greater does the torque generation ratio become.

A maximum value for the torque command value for the electric motor 2 when the accelerator pedal depression amount is unity is calculated by the maximum torque calculation unit 203. And a minimum value for the torque command value for the electric motor 2 when the accelerator pedal depression amount is zero is calculated by the minimum torque calculation unit 204. Here, this maximum value and this minimum value for the torque command value for the electric motor 2 are calculated on the basis of the rotational speed of the electric motor 2 and the torque that can be outputted at that rotational speed.

The range of torque that can be outputted by operation of the accelerator pedal is calculated by the drive control unit 201 with a subtractor 205, by obtaining the difference between the maximum torque calculated by the maximum torque calculation unit 203 and the minimum torque calculated by the minimum torque calculation unit 204. Next, the amount of torque increase due to operation of the accelerator is calculated by a multiplier 206 that multiplies the above described torque range (width) that can be outputted by the torque generation ratio. Furthermore, a torque command value is set for the electric motor 2 by the amount of torque increase due to operation of the accelerator and the above described minimum torque being added together by an adder 207.

Figure 5:
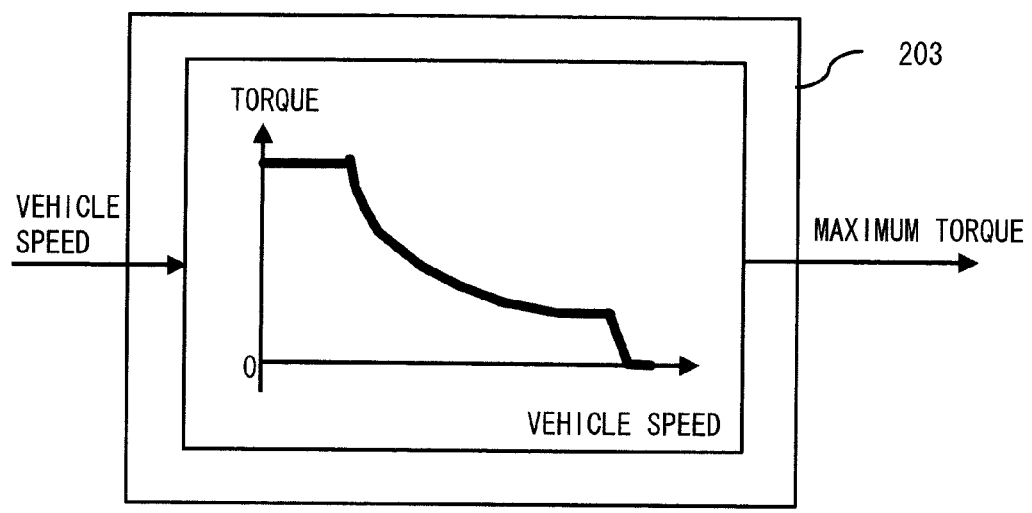
FIG. 5 is a figure showing an example of a correspondence relationship between vehicle speed and maximum torque, held in a maximum torque calculation unit 203.

The maximum torque is calculated by the maximum torque calculation unit 203 on the basis of the relationship between the maximum value of the torque command value to the electric motor 2 and the vehicle speed, as shown in FIG. 5. In other words, the torque that can be outputted becomes lower, the higher the rotational speed of the electric motor becomes. Moreover, the torque command value that can be outputted at the highest rotational speed of the electric motor 2 is set to zero, from the viewpoint of protection of the equipment.

Figure 6:
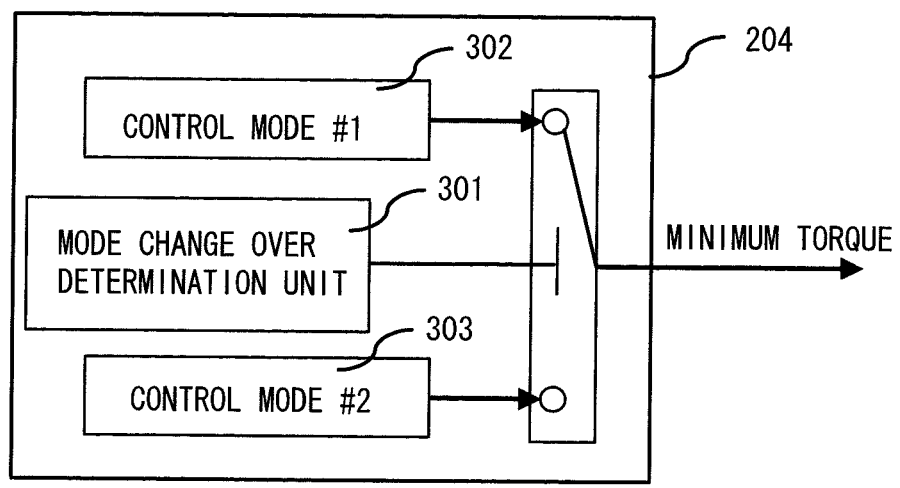
FIG. 6 is a figure showing control blocks included in a minimum torque calculation unit 204.

As shown in FIG. 6, in the minimum torque calculation unit 204, output is taken out from either a control block 302 for executing a control mode #1 or from a control block 303 for executing a control mode #2, and these control block outputs are changed over according to a change over command from the mode change over determination unit 301. Here, the control mode #1 is a control mode in which regeneration torque is generated when the accelerator is OFF, rather like engine braking in the case of a gasoline engined vehicle. On the other hand, the control mode #2 is a control mode that has regions in which the regeneration torque is stopped on the basis of vehicle speed information and so on when the accelerator pedal is not depressed.

The mode change over decision unit 301 includes a manually actuated switch for mode changing over (not shown in the drawings), and either one of the control block 302 for executing the control mode #1 or the control block #303 for executing the control mode #2 can be selected, on the basis of change over information from this switch for mode changing over.

In the following, the control mode #1 and the control mode #2 will be explained in further detail with reference to FIGS. 7 and 8.

Figure 7:
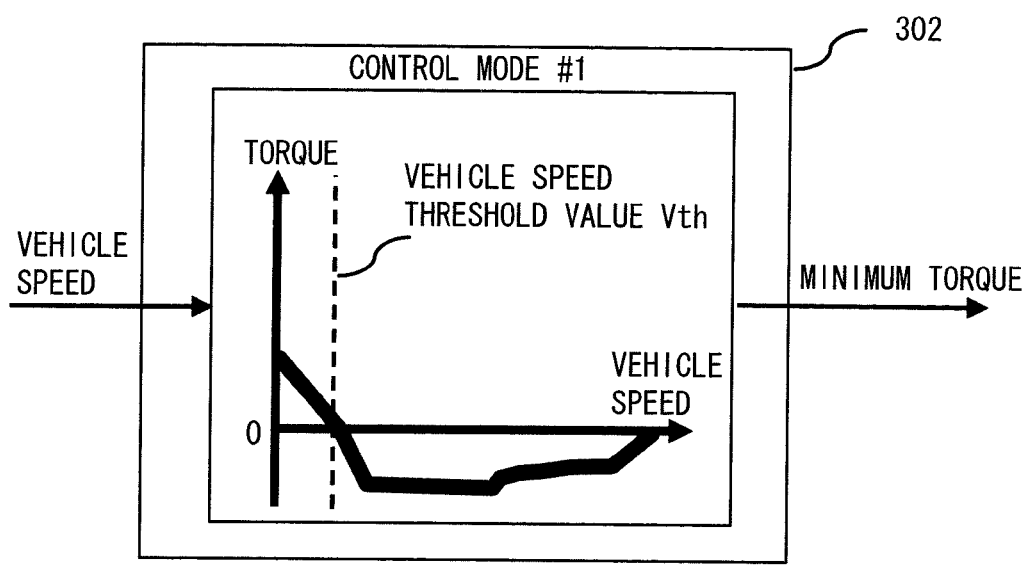
FIG. 7 is a figure showing a correspondence relationship between vehicle speed and minimum torque in a control block 302 for executing a control mode #1.

FIG. 7 is a figure showing a correspondence relationship between vehicle speed and minimum torque in the control block 302 for executing the control mode #1. In this control mode #1, as shown in FIG. 7, the minimum torque is calculated on the basis of this relationship between the torque command value for the electric motor 2 and the vehicle speed. The region of positive torque represents driving under power, while the region of negative torque represents energy regeneration. When the vehicle speed is in a region lower than a threshold value Vth, a positive torque is generated in order to imitate the creep torque of a gasoline engined vehicle, while, when the vehicle speed is in a region higher than this threshold value Vth, a negative torque is generated in order to imitate the engine braking of a gasoline engined vehicle. The engine braking in this embodiment is usually performed so as to create a braking force of around 0.05 to 0.08 [G].

Figure 8:
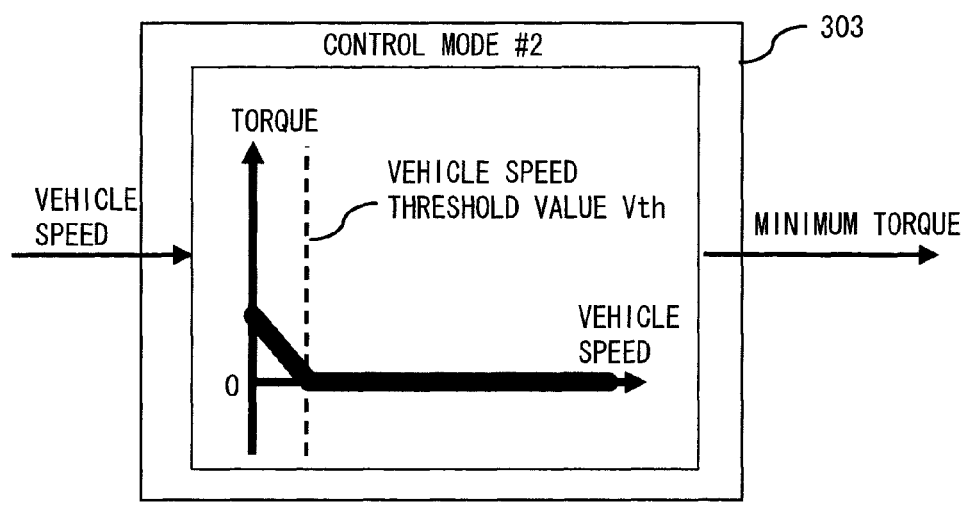
FIG. 8 is a figure showing a correspondence relationship between vehicle speed and minimum torque in a control block 303 for executing a control mode #2.

FIG. 8 is a figure showing a correspondence relationship between vehicle speed and minimum torque in the control block 303 for executing the control mode #2. In this control mode #2, as shown in FIG. 8, the minimum torque is calculated on the basis of this relationship between the torque command value for the electric motor 2 and the vehicle speed. In other words, when the vehicle speed is in the region lower than the threshold value Vth, in the same manner as in the case of the control mode #1, positive torque is generated in order to imitate the creep torque of a gasoline engined vehicle. On the other hand, when the vehicle speed is in the region higher than the threshold value Vth, the minimum torque is set to zero. In other words, it is prohibited to set the minimum torque to zero when the vehicle speed is less than the threshold value Vth.

Returning again to FIG. 3, the torque command value when the amounts of depression of both the accelerator pedal and the brake pedal are simultaneously zero will be explained.

The amount of depression of the accelerator pedal is detected by the accelerator pedal sensor 101, and is inputted to the torque generation ratio calculation unit 202 as an accelerator pedal depression amount (from zero to unity). And since, as already described, when the accelerator pedal depression amount is zero the torque generation ratio also becomes zero, accordingly the output from the multiplier 206 becomes zero. As a result, the minimum torque obtained from the minimum torque calculation unit 204 comes to be outputted just as it is, as the output of the drive control unit 201.

In a similar manner, the amount of depression of the brake pedal (from zero to unity) is detected by the brake pedal sensor 102. And the output from the brake pedal sensor 102 is inputted to the brake pedal depression amount determination unit 210, that make a decision as to whether or not the brake pedal depression amount is zero. When it has been determined that the brake pedal depression amount is zero, on the basis of a switch control signal outputted from the brake pedal depression amount determination unit 210, a torque command value corresponding to the control mode #1 or to the control mode #2 is outputted from the output line A of the change over switch 215. On the other hand, when it has been determined that the brake pedal depression amount is not zero, a normal torque command value is outputted from the output line B of the change over switch 215. Here by a normal torque command value is meant a torque command value for use in drive control other than regeneration control according to this embodiment, but explanation thereof will be omitted, since this has no direct relationship with the present invention.

Since in the control mode #2, as described above, regeneration control of the electric motor 2 is stopped when both the accelerator pedal depression amount and the brake pedal depression amount are zero, accordingly, as a result, the opportunities come to be increased for regeneration (regenerative braking) at high efficiency due to the brake pedal being depressed. Because of this fact, it is possible to recuperate the energy of motion of the vehicle (i.e. the kinetic energy that it possesses) to the battery with good efficiency. Furthermore, if after the deceleration the vehicle is again accelerated, then, since no energy conversion loss occurs during deceleration but only during re-acceleration, accordingly it is possible to anticipate enhancement of the cruising range due to reduction of the losses. These merits will now be explained in further detail using the figures. The energy of motion of the vehicle may be referred to as the driving energy of the vehicle.

Figure 19:
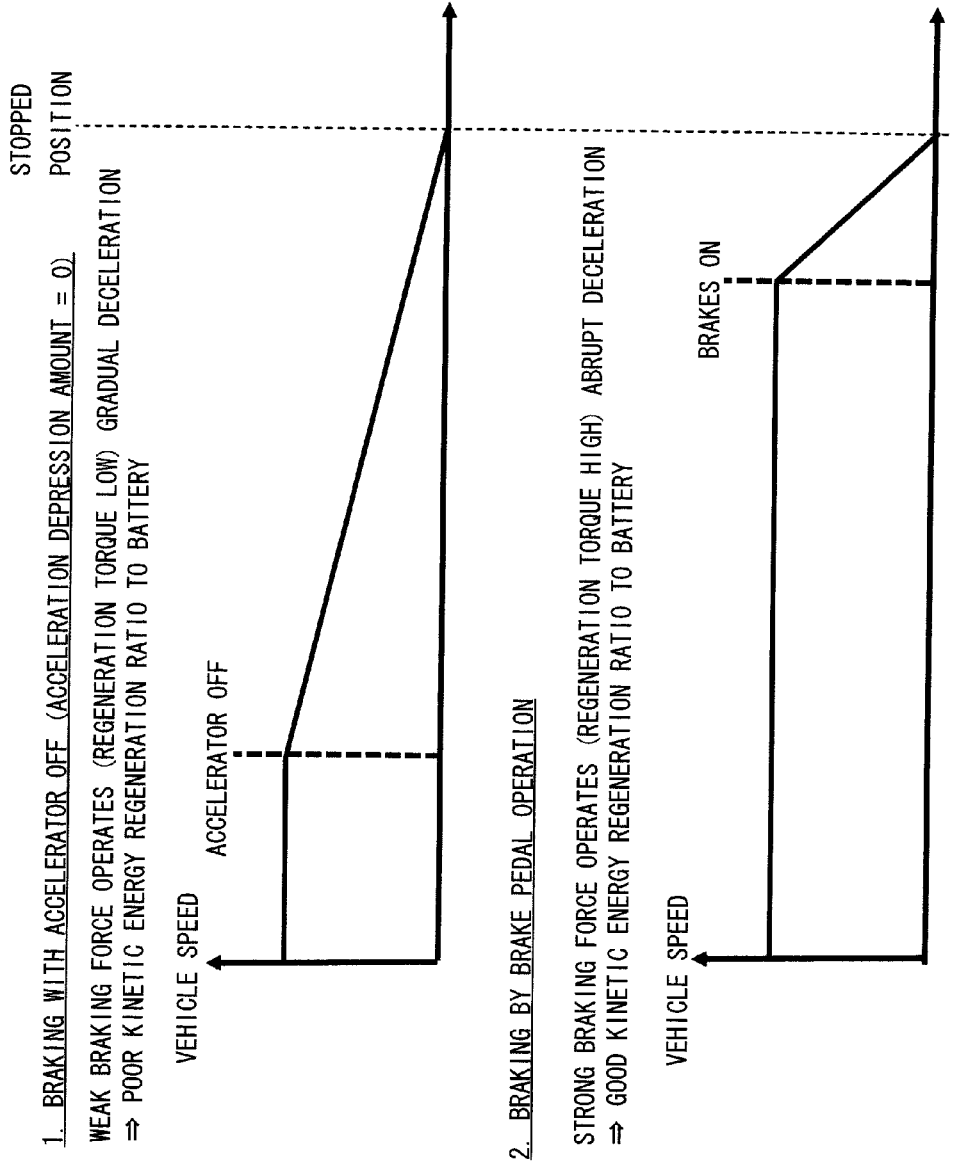
FIG. 19 is a figure for explanation of a method of deceleration with a conventional electric automobile.

FIG. 19 is a figure for explanation of the way in which a conventional electric automobile is decelerated, for correlation with the regeneration control according to this embodiment. As shown in this figure, with a conventional electric automobile, there are two types of braking operation: #1—braking due to the accelerator pedal being released (accelerator pedal actuation amount=zero); and #2—braking due to the brake pedal being actuated. Since, with the "#1—braking due to the accelerator pedal being released (accelerator pedal actuation amount=zero)" shown in the upper portion of this figure, only a weak braking force acts (i.e. the regeneration torque is low), accordingly only a gradual deceleration of the vehicle speed occurs. Since the braking due to this "#1—braking due to the accelerator pedal being released (accelerator pedal actuation amount=zero)" mode takes place in the region in which the regeneration efficiency is poor, accordingly the recuperation yield (i.e. the conversion efficiency) from the energy of motion of the vehicle (i.e. the kinetic energy that it possesses) to the battery becomes poor. On the other hand, with the "#2—braking due to the brake pedal being actuated" shown in the lower portion of this figure, rapid deceleration of the vehicle speed occurs, since a strong braking force acts (the regeneration torque is high). Since this braking due to the brake pedal being actuated takes place in the region in which the regeneration efficiency is good, accordingly the recuperation yield (i.e. the conversion efficiency) from the energy of motion of the vehicle (i.e. the kinetic energy that it possesses) to the battery becomes good.

FIG. 20 is a figure for explanation of the problematic features of this "#1—braking due to the accelerator pedal being released (accelerator pedal actuation amount=zero)" mode. Here, an outline explanation will be given of a case in which, after the vehicle speed has been reduced due to the accelerator pedal being released, the vehicle is then re-accelerated back to its original speed. As depicted on the left side of this figure, an energy loss takes place while the energy of motion of the vehicle (i.e. the kinetic energy that it possesses) is being converted to electrical energy. For example, when "100" of kinetic energy is retrieved, the energy actually received by the battery may be "72". Thereafter, as depicted on the right side of this figure, in order for the vehicle to be re-accelerated and to be provided with its original energy of motion (i.e., kinetic energy) that was "100", it is necessary for "138" of energy to be supplied from the battery. To put this in another manner, although "72" of energy was accumulated in the battery due to braking with the accelerator pedal not being depressed, it is necessary to supply "138" of energy in order to return the vehicle to its original state in which it possesses "100" of energy of motion (i.e. kinetic energy). The difference of 138−72=66 is the energy loss that inevitably takes place during braking with the accelerator pedal not being depressed.

This energy loss takes place while using the energy in the battery for conversion into energy of motion. To put it in another manner, if the cycle of driving under power→regeneration→driving under power is performed repeatedly, then energy loss takes place each time. Due to this fact, in order to reduce the energy losses, it is desirable for the driver to avoid imprudently performing regenerative braking by releasing the accelerator pedal (in which situation the regeneration torque is low), and it is preferable only to perform regeneration by pressing the brake pedal (in which situation the regeneration torque is high).

Figure 21:
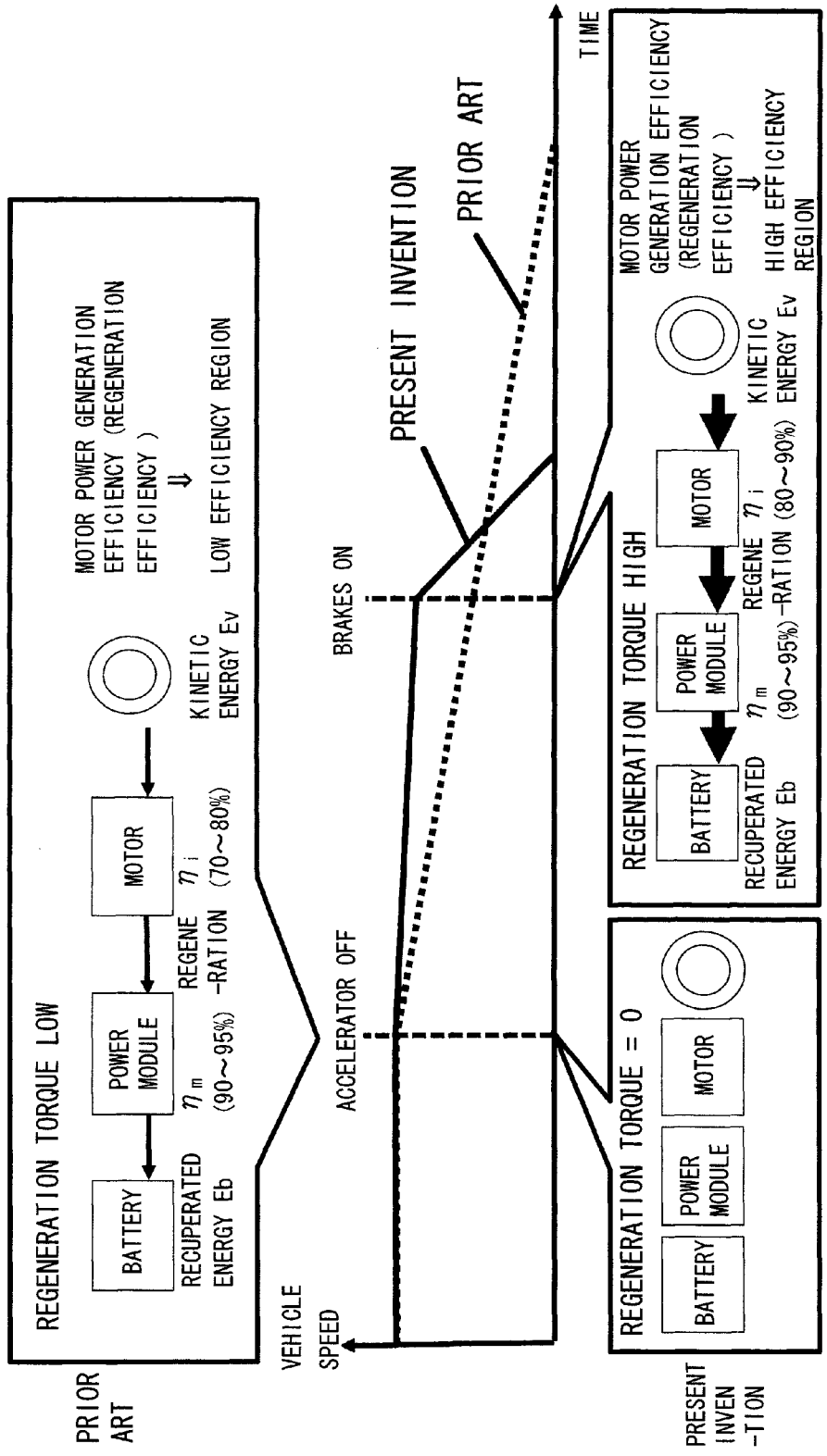
FIG. 21 is a figure for explaining in outline terms the beneficial effects of an electric vehicle to which the present invention is applied.

FIG. 21 is a figure for explaining in outline terms the beneficial effects of applying the present invention to an electric vehicle. In the upper portion of this figure, there is shown the situation in the prior art when braking with the accelerator pedal released takes place. As already explained, in this case, regeneration is performed in the region in which the efficiency is low. On the other hand since, as shown in the lower portion of this figure, with an electric vehicle to which the present invention is applied, regeneration is not performed when the accelerator pedal is released, accordingly the vehicle speed hardly drops at all, and regeneration is only performed when the brakes are applied, now at high efficiency. As the result, it is possible to anticipate an increase in range of 3% to 5%. In particular, during town driving or the like in which acceleration and deceleration are repeatedly performed in turn, the beneficial effects for prevention of energy losses become notable.

Figure 22:
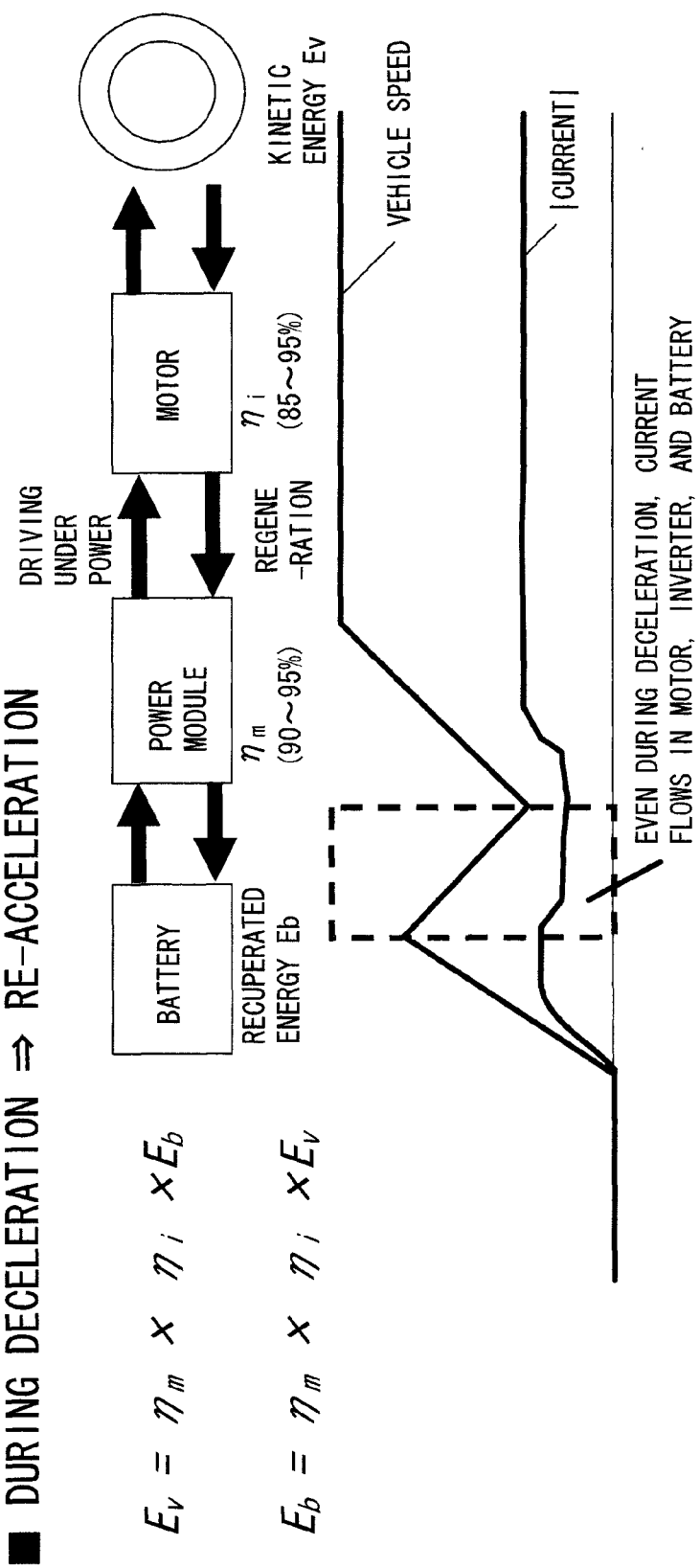
FIG. 22 is another figure for explaining in outline terms the beneficial effects of an electric vehicle to which the present invention is applied.

FIG. 22 is a figure for outline explanation, from another standpoint, of the beneficial effects of an electric vehicle to which the present invention has been applied. In this figure, a summary of the vehicle speed and the drive current (actually, its absolute value) during deceleration of the vehicle and subsequent re-acceleration are depicted. As shown in this figure, current flows in the motor, the inverter, and the battery even during deceleration. As already described, the energy losses during the cycle of acceleration→deceleration (regeneration)→re-acceleration (driving under power) are high. As a result, heat is generated in each of the components due to these energy losses. Moreover, energy is required for cooling to combat this heat generation, and this is a further cause for increase of the energy loss. The stopping of regeneration when the accelerator is released is also very effective due to the above considerations.

Figure 23:
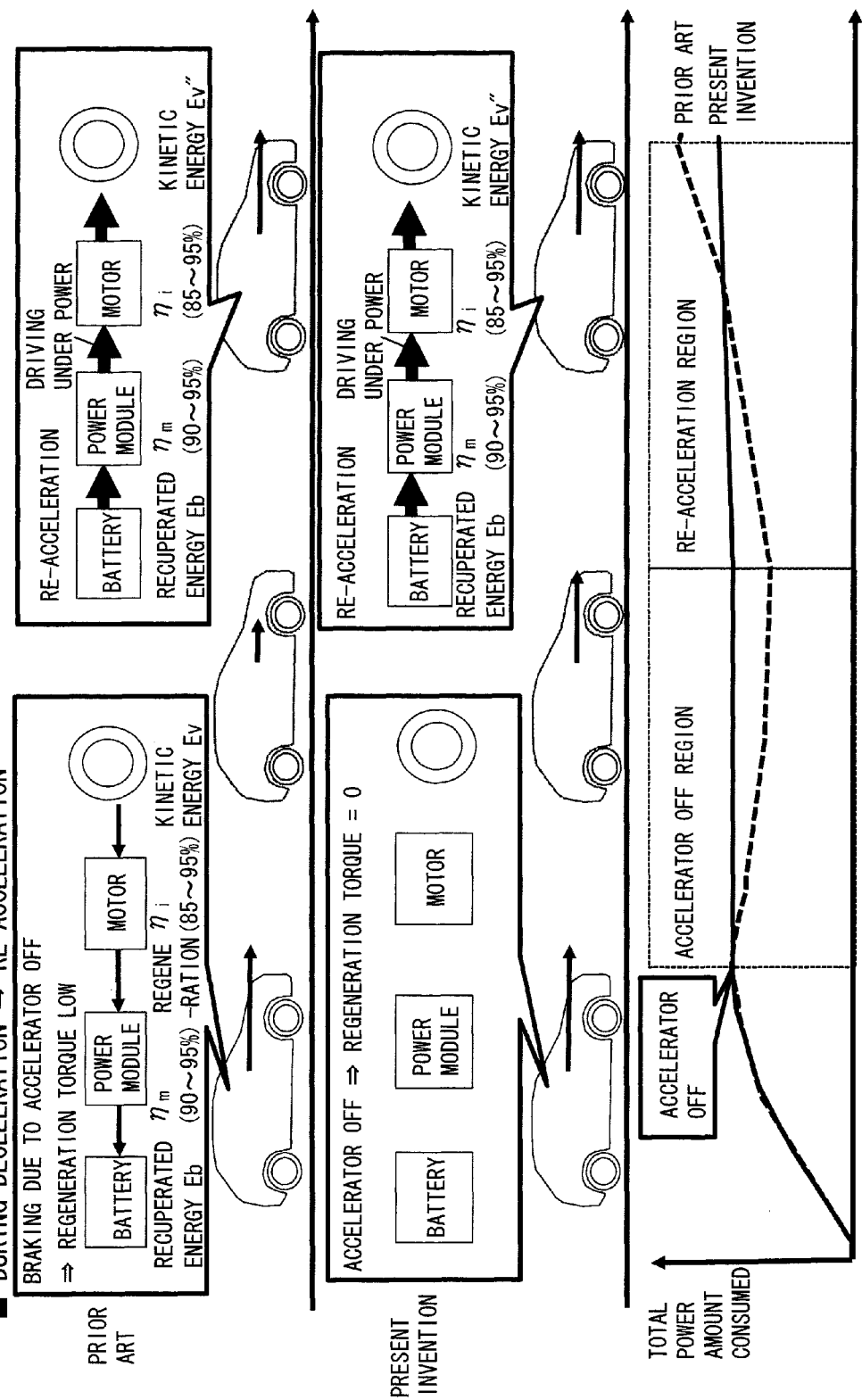
FIG. 23 is yet another figure for explaining in outline terms the beneficial effects of an electric vehicle to which the present invention is applied.

FIG. 23 is an explanatory figure in which the various advantageous effects described above are summarized. While in the prior art energy retrieval was performed during braking with the accelerator pedal released, and thus with the regeneration torque low, with an electric vehicle to which the present invention is applied, the regeneration torque is zero when the accelerator pedal is released. Thus, although energy recuperation cannot be performed during the interval in which the accelerator pedal is released, since it is possible to keep the losses of energy during re-acceleration to a low level, as a result, as shown in the lower portion of this figure, it is possible to reduce the final total amount of electrical power consumed yet further.

Operational Benefits of the First Embodiment

According to this first embodiment, the following beneficial operational effects may be obtained.

(1) Since, with this drive control device for the electric vehicle that is driven by the electric motor 2, the minimum torque setting unit 204 is provided that, when it has been detected by the accelerator pedal sensor 101 and the brake pedal sensor 102 that the accelerator pedal depression amount and the brake pedal depression amount are both zero, sets the regenerative braking torque command value to zero during this interval, accordingly not only is regeneration at low efficiency prevented when the vehicle is being decelerated and stopped, but also the opportunities are increased for regeneration at high efficiency (i.e. regenerative braking) when the brake pedal is depressed. Due to this, it is possible to retrieve the energy of motion of the vehicle (i.e. the kinetic energy that it possesses) to the battery at high efficiency. Moreover since, if the vehicle is re-accelerated after having been decelerated, energy conversion losses only take place during the re-acceleration, as a result it is possible to anticipate that the cruising range will be increased due to reduction of energy losses.

(2) Since the mode change over determination unit 301 selects the control mode #2 (i.e. the regeneration stopped mode) for the electric motor according to the setting of the manual change over switch (not shown in the drawings) that is actuated in advance by the driver, accordingly it is possible to perform control of the regeneration according to the intentions of the driver.

(3) Since, if the regeneration stopped mode is not selected as the control mode, the control mode is set in which regeneration torque of the electric motor 2 is generated when both the accelerator pedal depression amount and also the brake pedal depression amount are zero, accordingly it is possible to obtain braking characteristics of the prior art type.

(4) By setting the torque command value for the electric motor to a positive value (refer to FIG. 7) when the speed of this electric vehicle is less than the predetermined threshold value, even if the regeneration stopped mode is selected, it is possible to generate a creep torque, resembling that in the case of a gasoline engined vehicle that is equipped with an automatic transmission.

The Second Embodiment

While in the first embodiment described above the regeneration was always set to zero in the control mode #2, as explained with reference to FIG. 8, in the second embodiment described below, according to the maximum possible torque for regeneration that is determined according to the vehicle speed, the regeneration torque is set to zero or to some other value. This second embodiment will now be explained in detail in the following, with reference to FIGS. 9 through 16.

Figure 9:
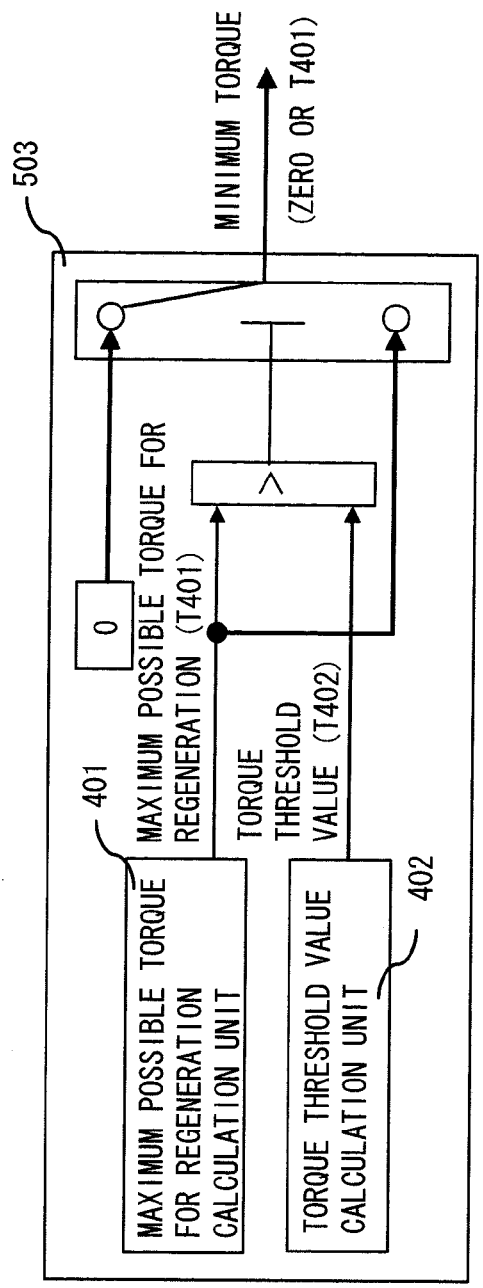
FIG. 9 is a diagram showing the internal structure of a control block 503 for executing the control mode #2 in a second embodiment.

FIG. 9 is a diagram showing the internal structure of a control block 503 for executing the control mode #2 in this second embodiment. And FIG. 10 is a figure showing a correspondence relationship between vehicle speed and maximum possible torque for regeneration, in a maximum possible torque for regeneration calculation unit 401 of this control block 503.

In this second embodiment, in the control mode #2, the maximum possible torque for regeneration calculated by the maximum possible torque for regeneration calculation unit 401 and the torque threshold value calculated by the torque threshold value calculation unit 402 are compared together, and, if the maximum possible torque for regeneration is larger than the torque threshold value, then the minimum torque is set to zero; while, if the maximum possible torque for regeneration is smaller than the torque threshold value, then this maximum possible torque for regeneration is outputted as the minimum torque. Here, the maximum possible torque for regeneration means the maximum value of the regeneration torque that can be outputted by the electric motor 2, and is determined on the basis of the rated output of the electric motor 2 or the like. As shown in FIG. 10, the higher is the vehicle speed or the rotational speed of the electric motor, the smaller the maximum possible torque for regeneration becomes.

Figure 10:
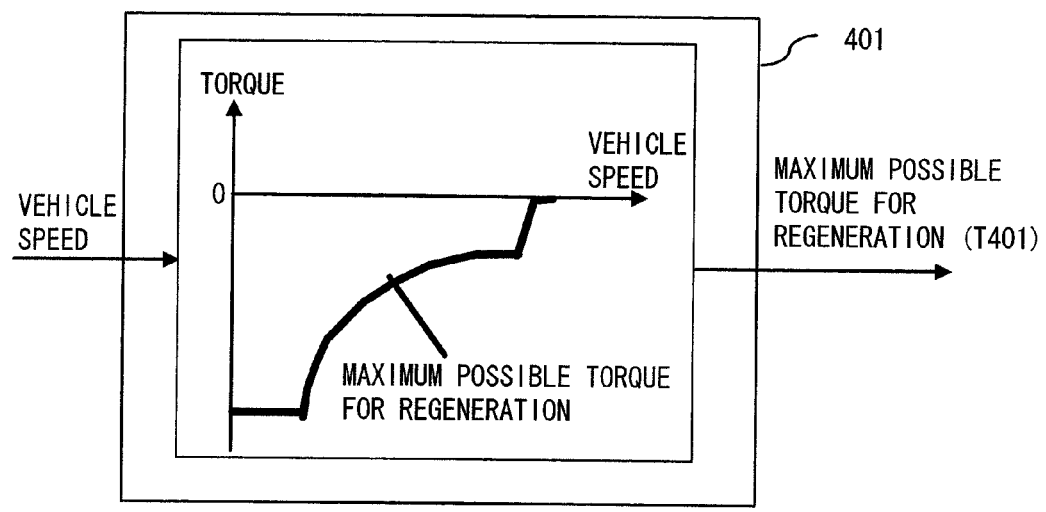
FIG. 10 is a figure showing a correspondence relationship between vehicle speed and maximum possible torque for regeneration, in a maximum possible torque for regeneration calculation unit 401.

The maximum regeneration torque calculation unit 401 outputs the maximum possible torque for regeneration on the basis of the vehicle speed, as shown in FIG. 10. It should be understood that, as shown in FIG. 11, a value could also be used for the maximum possible torque for regeneration that is obtained by multiplying the value of the maximum possible torque for regeneration calculated on the basis of the vehicle speed by the torque generation ratio calculated by the temperature limit calculation units 501A through 501C.

Figure 11:
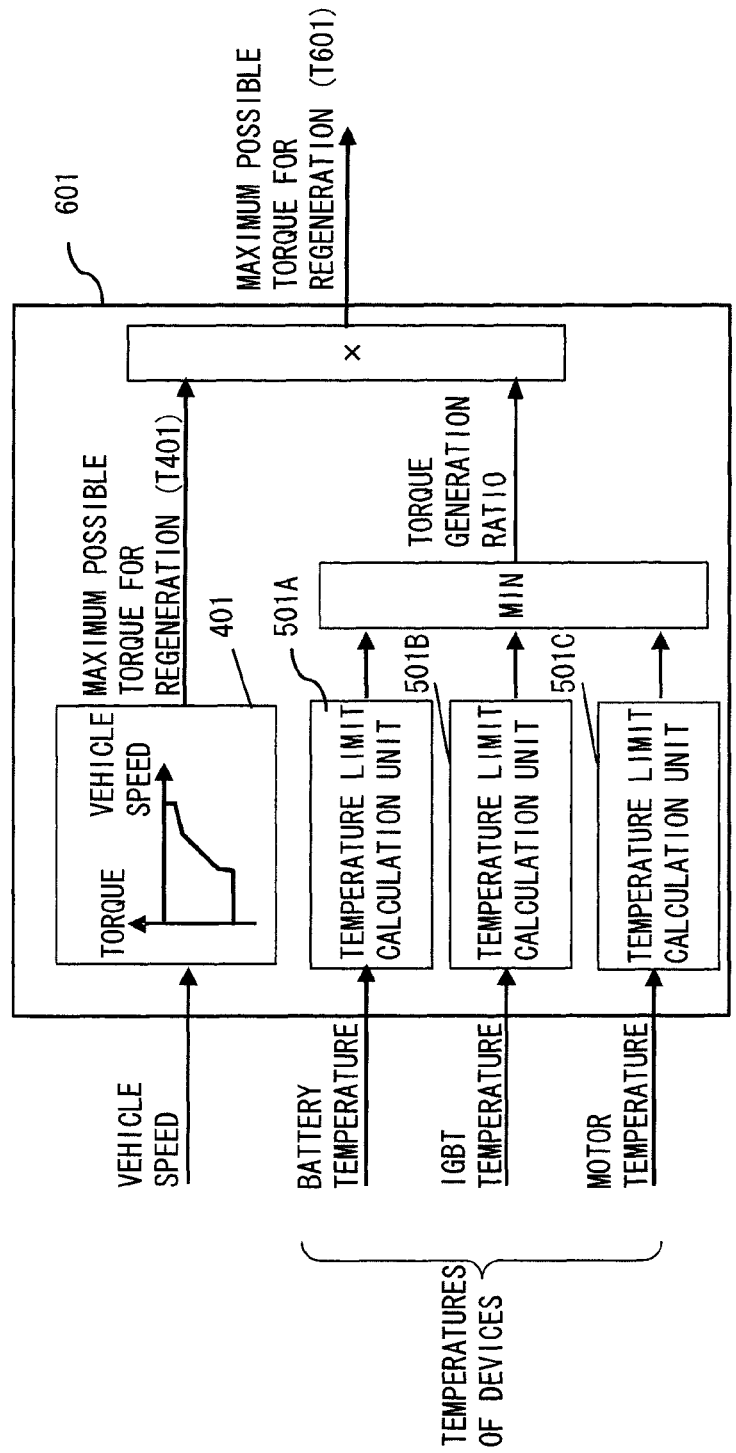
FIG. 11 is a block diagram showing a maximum torque for regeneration calculation unit 601 that takes temperature information of various devices into consideration.

FIG. 11 is a block diagram showing a maximum torque for regeneration calculation unit 601 that takes temperature information of various devices into consideration. The torque generation ratio is calculated by the temperature limit calculation units 501A through 501C on the basis of various temperatures, such as the temperature of the battery 1, the temperatures of the IGBT elements of the power module 4, and the temperature of the electric motor 2. This torque generation ratio specifies a ratio that limits the torques, and, if the temperatures of the devices are lower than their threshold values, then this torque generation ratio becomes unity, and this means that no limitation is imposed upon the torque. On the other hand, if the temperature of one or more of the devices becomes greater than its threshold value, then the torque generation ratio is set to become lower, the higher is that device temperature. Due to this, it becomes possible to prevent problems that accompany elevation of temperature of the devices (such as deterioration of the battery, demagnetization of the electric motor 2, destruction of the elements of the power module 4, and so on).

Figure 12:
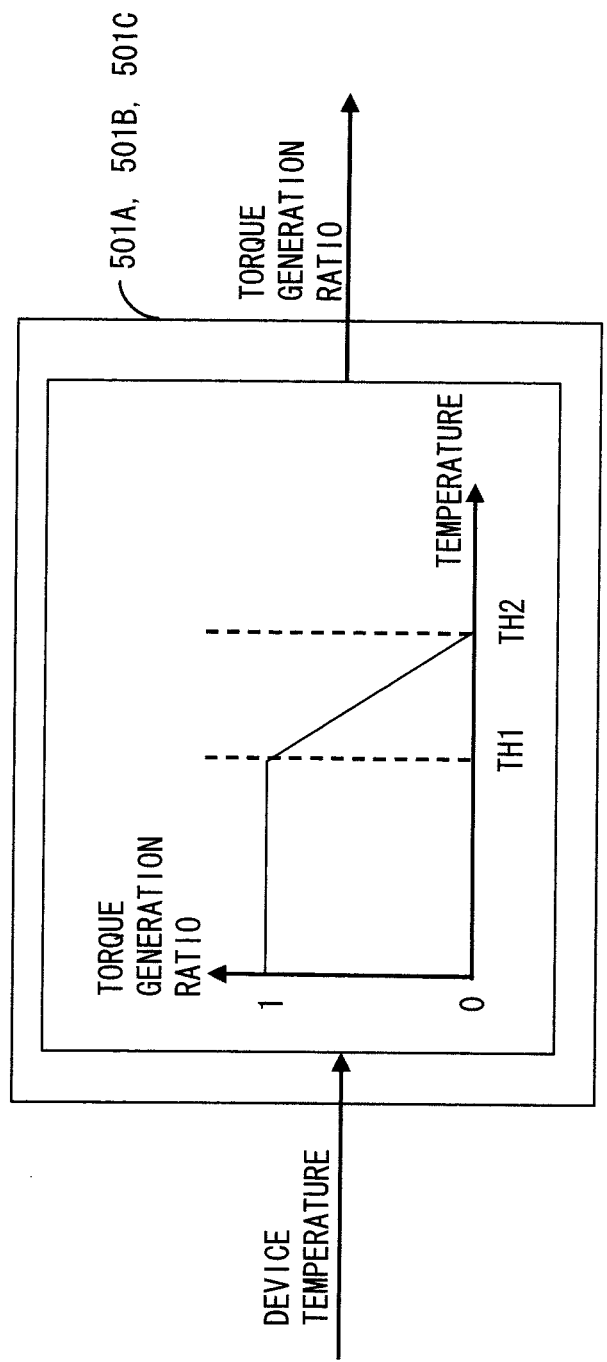
FIG. 12 is a figure showing a correspondence relationship between temperature of device and torque generation ratio, in temperature limit calculation units 501A, 501B, and 501C.

FIG. 12 shows a relationship between device temperature and torque generation ratio: in the region where the device temperature is lower than a threshold value TH1 the torque generation ratio is set to unity, while in the region where the device temperature is higher than a threshold value TH2 the torque generation ratio is set to zero. Moreover, in the region of device temperature between TH1 and TH2, the torque generation ratio is set to drop gradually from unity to zero along with increase of temperature. Protection of the equipment is prioritized by providing this type of margin.

The setting of the threshold values TH1 and TH2 shown in FIG. 12 is different for each one of the devices. In other words, for each of the devices, TH2 is set to a recommended value, while TH1 is set so that, the smaller is the thermal capacity of the device for the same output, the narrower is the temperature width between TH1 and TH2. By doing this it is arranged, while protecting the various devices, to make it possible to utilize the output of the system to the maximum acceptable limit.

Figure 13:
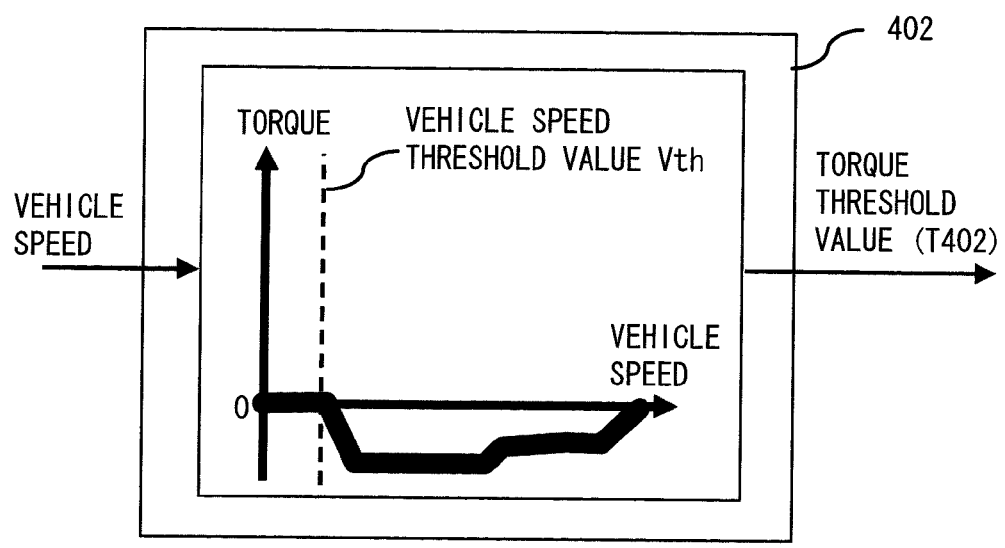
FIG. 13 is a figure showing a correspondence relationship between vehicle speed and torque threshold value, in a torque threshold value calculation unit 402.
Figure 14:
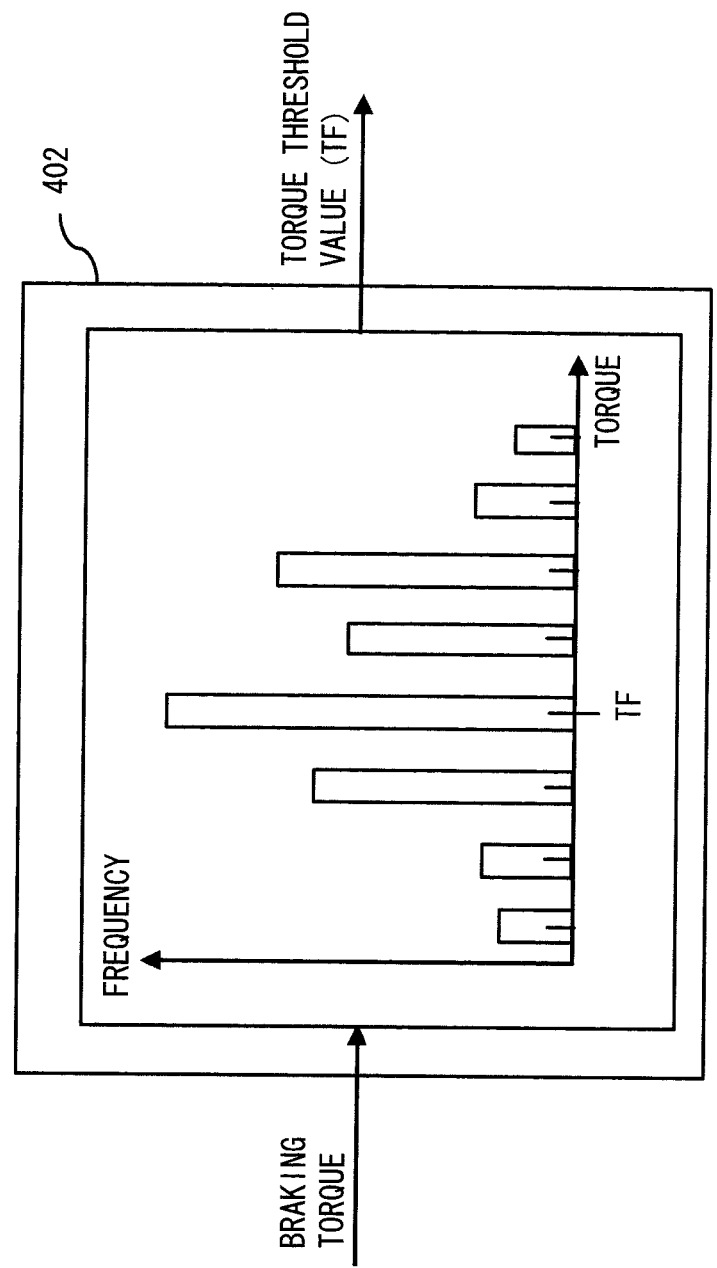
FIG. 14 is a figure showing a correspondence relationship between braking torque during braking and torque threshold value, in the torque threshold value calculation unit 402.

The torque threshold value calculation processing unit 402 of FIG. 9 changes the torque threshold value according to the vehicle speed. In concrete terms, as shown in FIG. 13, in the region in which the vehicle speed is less than a threshold value Vth the torque threshold value is set to zero, while in the region in which the vehicle speed is greater than the threshold value Vth the torque threshold value is set to an absolute value of negative torque that corresponds to engine braking. By doing this, if it is possible to generate a regeneration torque that corresponds to engine braking, then the minimum torque when the accelerator pedal is not depressed becomes zero, so that it is possible to reduce energy losses originating in the fact that regeneration at low efficiency is not implemented. It should be understood that it would also be acceptable to arrange to set the regeneration torque threshold value to a braking force that is equivalent to normal braking (around 1.1 to 1.3 G), this being substantially greater than the above braking force that is equivalent to engine braking. As a result, it is possible to recover braking force during normal braking by regeneration at high efficiency.

Furthermore, since during normal braking the braking force undergoes comparatively large variations that can be ascribed to operation by the driver, it would also be acceptable (refer to FIG. 14) to record braking torques during braking by each driver, to determine braking torque TF whose frequency of employment (occurrence) is highest among the braking torques during normal braking as being the braking torque during normal braking, and to set this value TF as the torque threshold value.

Figure 15A:
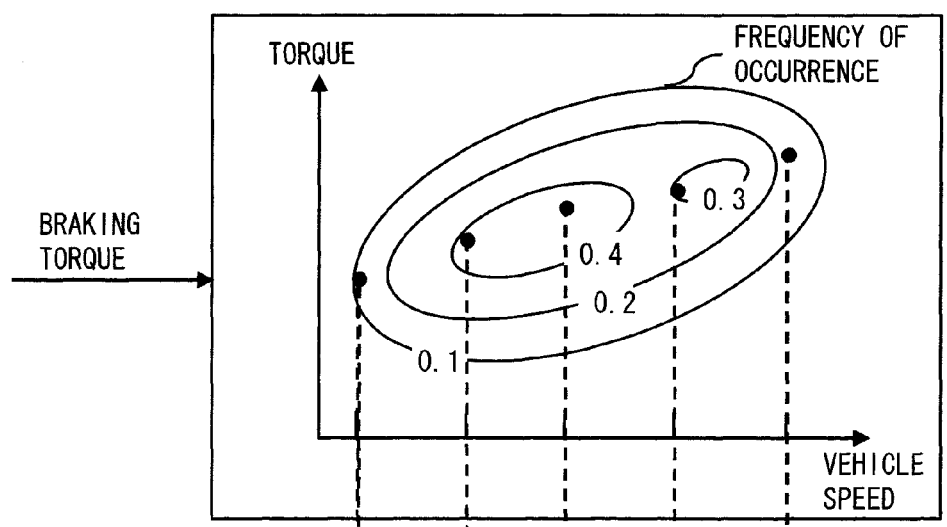
FIGS. 15A and 15B are figures showing relationships between braking torque and vehicle speed during braking, and torque threshold value, in the torque threshold value calculation unit 402.
Figure 15B:
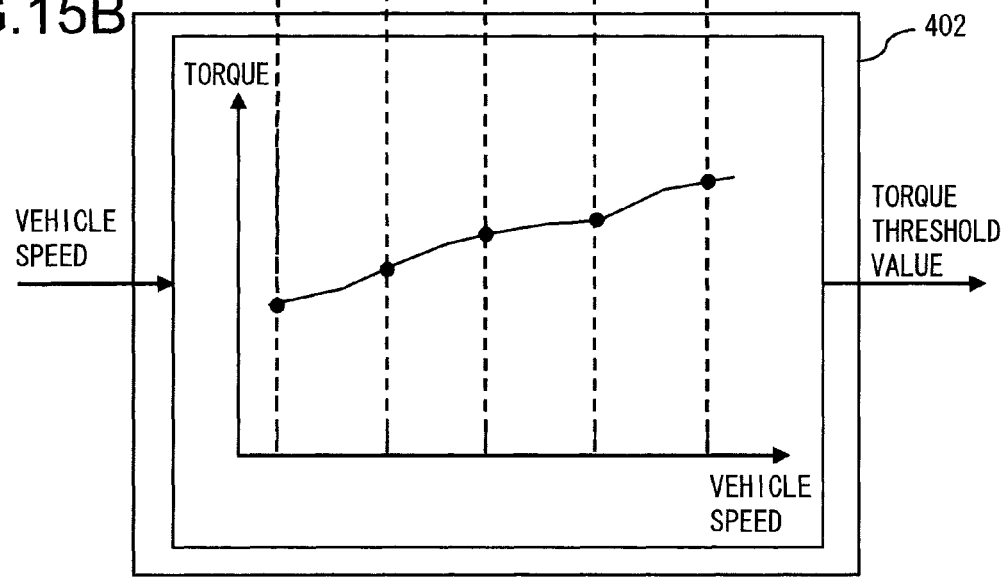

Moreover, since the braking force due to normal braking varies according to the vehicle speed, accordingly it would be acceptable, as shown in FIG. 15A, to record the vehicle speed and the braking torque during normal braking, to calculate, for each vehicle speed, the braking torque whose frequency of employment is the highest during normal braking and, as shown in FIG. 15B, to change the torque threshold value according to the vehicle speed. Since, by doing this, it is possible to estimate the normal braking torque during braking with high accuracy, accordingly it is possible to increase the amount of energy recovered due to regeneration during normal braking.

Operational Benefits of the Second Embodiment

According to this second embodiment, the following beneficial operational effects may be obtained.

(1) Since the maximum possible torque for regeneration calculation unit 401 is provided that calculates the maximum possible torque for regeneration by the electric motor on the basis of the road speed of the electric vehicle, and since it is possible to stop regeneration when this maximum possible torque for regeneration is greater than the torque threshold value calculated by the torque threshold value calculation unit 402, accordingly it is possible to prevent energy losses in a more appropriate manner.

(2) On the other hand, since control is executed to perform regeneration with the maximum possible torque for regeneration when the maximum possible torque for regeneration is smaller than the threshold value for stopping regeneration, accordingly it is possible to arrange not to stop regeneration when it is not necessary to do so.

The Third Embodiment

Figure 16:
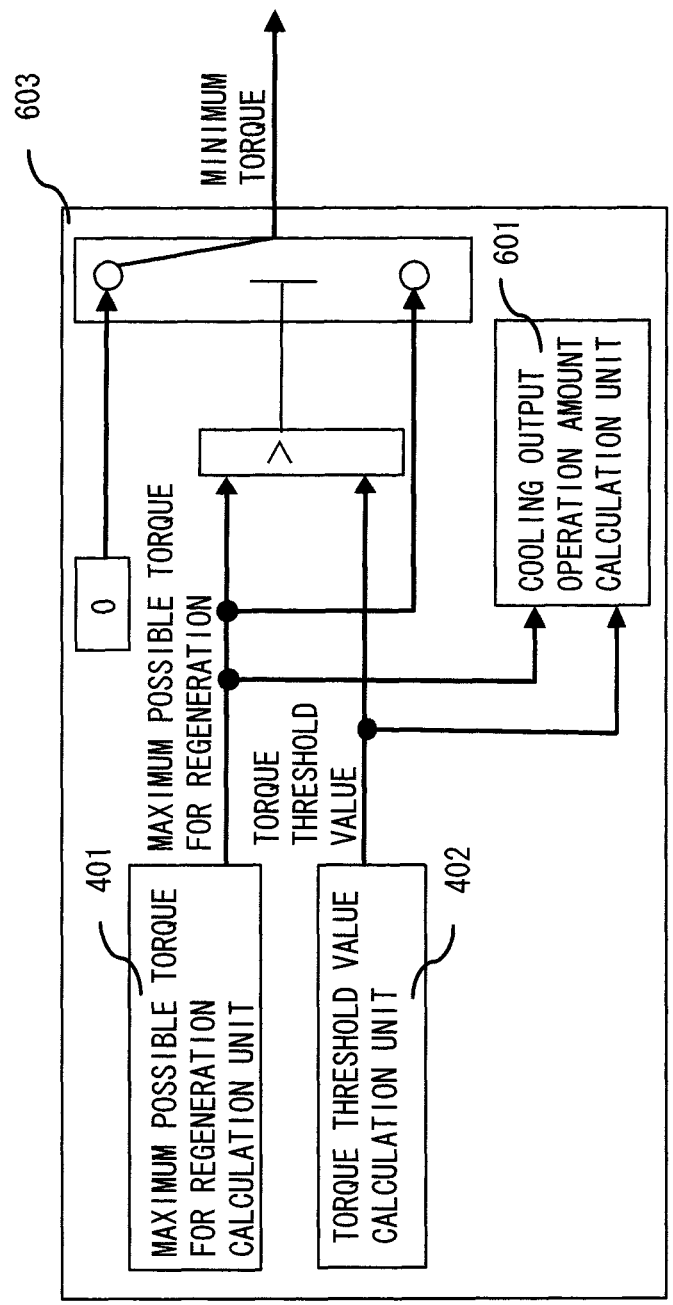
FIG. 16 is a diagram showing the internal structure of a control block 603 for executing the control mode #2 in a third embodiment.

This third embodiment is one in which the control block for executing the control mode #2 is further improved. FIG. 16 is a diagram showing the internal structure of a control block 603 for executing the control mode #2 in this third embodiment. With the control mode #2 in this third embodiment, in addition to the maximum possible torque for regeneration calculation unit 401 and the torque threshold value calculation unit 402 explained in connection with the second embodiment, there is also newly provided a cooling output operation amount calculation unit 601. The outputs of the devices described above (cooling fans, cooling water pumps and so on) are controlled by this cooling output operation amount calculation unit 601 on the basis of the maximum possible torque for regeneration calculated by the maximum possible torque for regeneration calculation unit 401 and the torque threshold value calculated by the torque threshold value calculation unit 402.

Figure 17:
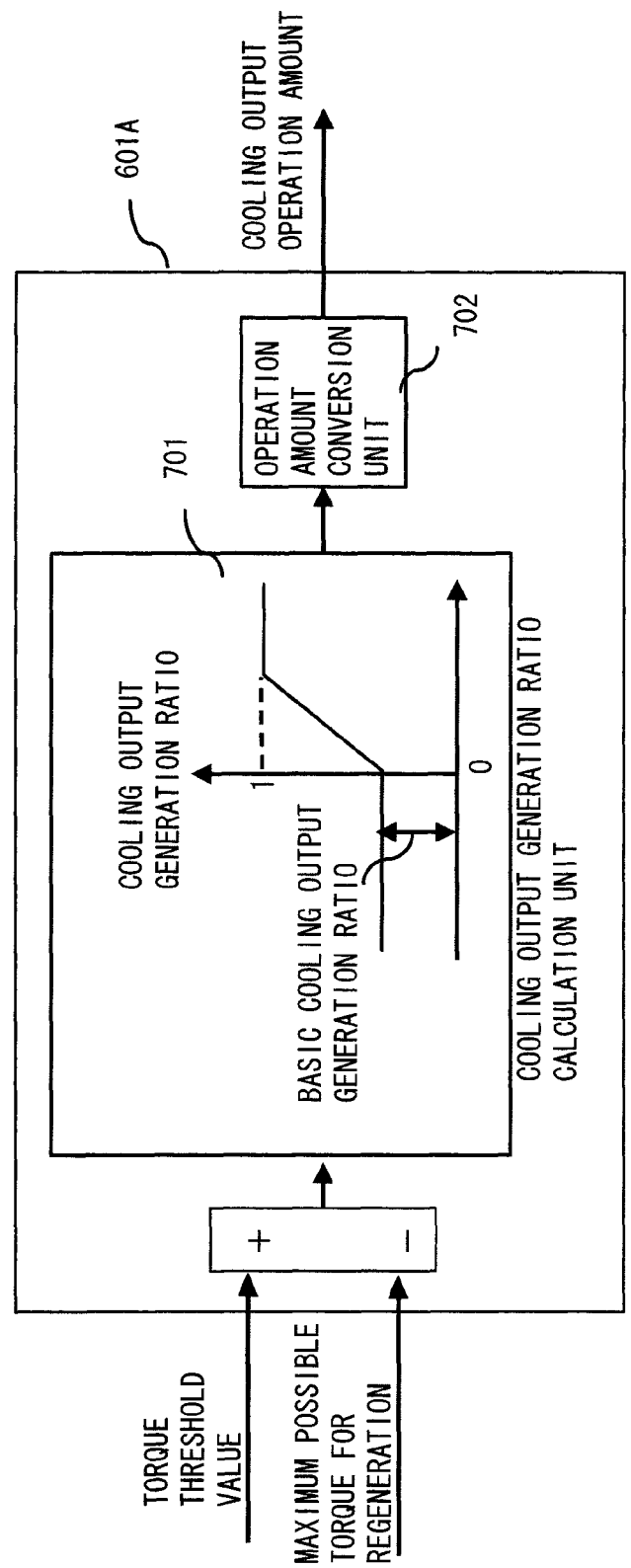
FIG. 17 is a control block diagram when feed forward control is used by a cooling output operation amount calculation unit 601A.

As shown in FIG. 17, the cooling output generation ratio is calculated by the cooling output operation amount calculation unit 601 according to the difference between the maximum possible torque for regeneration calculated by the maximum possible torque for regeneration calculation unit 401 and the torque threshold value calculated by the torque threshold value calculation unit 402. Here, the cooling output generation ratio is the outputs of the cooling pumps or cooling fans normalized, and is in the range from zero to unity. When this cooling output generation ratio is zero, this means that the cooling pumps and/or fans are in the state of not being supplied with electrical power, while, when this cooling output generation ratios is unity, this means that the cooling pumps and/or fans are in the state of being driven at their maximum possible outputs. And the higher the cooling output generation ratio is, the greater are the outputs of the cooling pumps and/or fans.

When the value obtained by subtracting the maximum possible torque for regeneration from the torque threshold value is less than zero, then the cooling output operation amount calculation unit 601 sets a basic cooling output generation ratio; and, when it is greater than zero, the greater is this difference between the maximum possible torque for regeneration and the torque threshold value, the larger the cooling output operation amount calculation unit 601 sets the cooling output generation ratio. Here, this basic cooling output generation ratio is a value that is calculated on the basis of the recommended values for the cooling outputs of the devices (i.e. the cooling flow rates, the cooling temperatures, and so on).

On the basis of the cooling output generation ratio, a value converted into an operation amount for the cooling devices, for example a PWM duty ratio or the like, is outputted by the operation amount conversion unit 702 of FIG. 17. Along with elevation of the cooling output of the devices, by lowering the temperature of the devices, the maximum possible torque for regeneration becomes larger. Due to this, it becomes possible to reduce the region in which regeneration at low efficiency is implemented when the accelerator pedal is not depressed, and thus to reduce the losses of energy.

Figure 18:
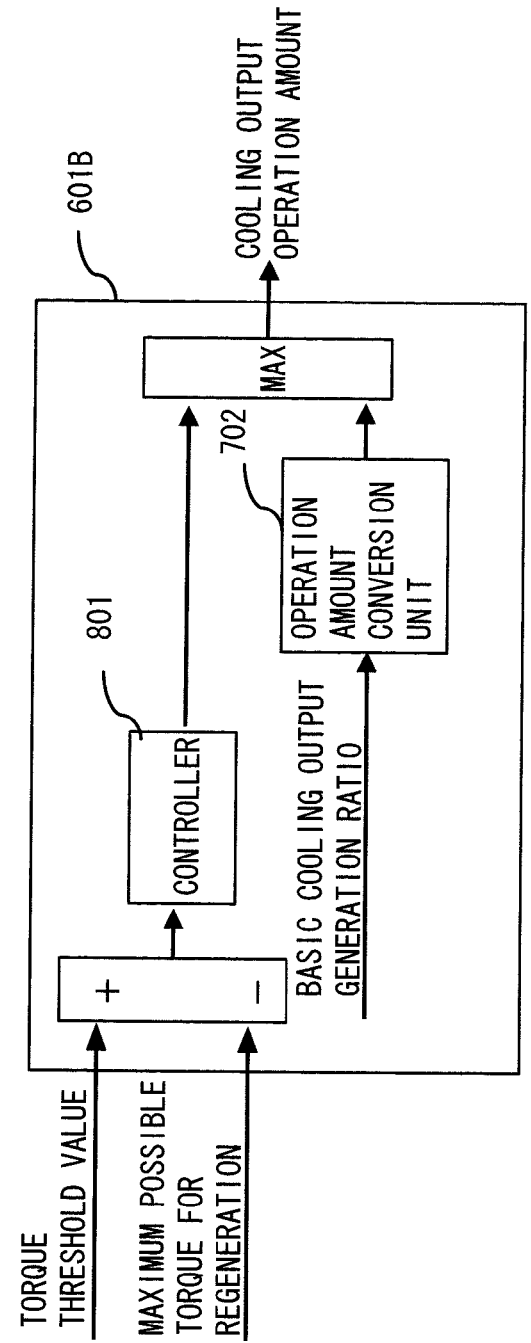
FIG. 18 is a control block diagram when feedback control is used by the cooling output operation amount calculation unit 601B.

It should be understood that, instead of the cooling output operation amount calculation unit 601A shown in FIG. 17, it would also be possible to use the cooling output operation amount calculation unit 601B shown in FIG. 18. In other words, the cooling output operation amount could be controlled using a controller 801, so that the maximum possible torque for regeneration becomes the torque threshold value. Here, the controller 801 uses feedback control like PID, PI, or the like. By doing this, it is possible to enhance the cooling output when the maximum possible torque for regeneration is smaller than the torque threshold value, and it is possible to keep the maximum possible torque for regeneration greater than or equal to the torque threshold value.

In FIG. 18, the value outputted by the controller 801 is compared with the cooling output operation amount at the basic cooling output generation ratio, and the one of these operation amounts that is the larger is outputted as the cooling output operation amount. By doing this it is possible to prevent abrupt decrease of the cooling output, even if the maximum possible torque for regeneration is larger than the torque threshold value.

Operational Benefits of the Third Embodiment

According to this third embodiment, the following beneficial operational effects may be obtained.

(1) Since the cooling output operation amount calculation unit 601 is provided that, when the maximum possible torque for regeneration is less than the torque threshold value, sets the outputs of the cooling devices to be greater, the greater is the difference between the maximum possible torque for regeneration and the torque threshold value, accordingly, by utilizing the temperature dependence of the maximum possible torque for regeneration, it is possible to extend the maximum possible torque for regeneration to be higher than the torque threshold value.

(2) In a similar manner, it is possible to increase the outputs of the cooling devices until the maximum possible torque for regeneration becomes greater than or equal to the torque threshold value.

Other Variant Embodiments (1) The present invention should not be considered as being limited to a vehicle of the structure shown in FIG. 1; it may be applied to any vehicle that employs an electric motor (motor-generator) 2 as its source of drive power.

(2) It would also be acceptable to arrange not to use a manual change over switch for the mode change over determination unit 301, but rather to change over to the control mode #2 when it has been decided, on the basis of information from the vehicle environmental information detection device 105 or from the information communication device 106, that the vehicle is traveling in congested traffic or is cruising at high speed.

(3) It would also be possible to arrange to set the torque to zero in the regions in which the vehicle speed in the control mode #1 and in the control mode #2 is lower than the threshold value Vth, so as not to generate any simulated creep torque.

The above explanation has only been given by way of example, and the present invention should not be considered as being limited by the above described embodiments and variant embodiments, provided that the essential characteristics of the present invention are not departed from. It is possible to utilize the embodiments and variant embodiments in any of various ways, either singly or in any of various plural combinations. It would also be possible to combine the variant embodiments together in any of various ways. Furthermore, various other implementations that are considered to fall within the range of the technical concept of the present invention are also to be understood as being included within the range of the present invention.

What is claimed is:

1. A drive control device for an electric vehicle that is driven by a motor-generator, comprising:
   a detection unit configured to detect when an accelerator pedal depression amount and a brake pedal depression amount of the electric vehicle are both zero; and
   a control unit configured to, when in a regeneration stopped mode that is a control mode among a plurality of modes, set a regenerative braking torque command value for the motor-generator to zero, in response to the detection unit detecting that an accelerator pedal depression amount and a brake pedal depression amount of the electric vehicle are both zero, except when a speed of the electric vehicle is less than a predetermined threshold value; and
   a determination unit configured to determine whether or not a maximum possible torque for regeneration of the motor-generator is greater than or equal to a predetermined regeneration stopping threshold value, wherein the maximum possible torque for regeneration of the motor-generator is calculated based upon a speed of the electric vehicle, and wherein when the determination unit determines that the maximum possible torque for regeneration of the motor-generator is greater than or equal to a predetermined regeneration stopping threshold value, the regeneration stopped mode is selected as the control mode.

2. A drive control device for an electric vehicle according to claim 1, further comprising:
   a manual mode change-over unit configured to select the regeneration stopped mode from among the plurality of modes, when the determination unit determines that the maximum possible torque for regeneration of the motor-generator is greater than or equal to a predetermined regeneration stopping threshold value.

3. A drive control device for an electric vehicle according to claim 1,
   wherein when the regeneration stopped mode is not selected as the control mode among the plurality of modes, another control mode among the plurality of modes is selected, in which a negative regeneration torque of the motor-generator is generated when both the accelerator pedal depression amount and the brake pedal depression amount are zero and the speed of the electric vehicle is greater than a predetermined threshold value.

4. A drive control device for an electric vehicle according to claim 3,
   wherein either one of the control mode among a plurality of modes and the another control mode among a plurality of modes is selected, based upon environmental information obtained from a unit configured to acquire the environmental information.

5. A drive control device for an electric vehicle according to claim 1,
   wherein even when the regeneration stopped mode is selected, the control unit performs regeneration control at the maximum possible torque for regeneration when the determination unit determines that the maximum possible torque for regeneration is smaller than the predetermined regeneration stopping threshold value.

6. A drive control device for an electric vehicle according to claim 5, further comprising:
   a cooling control unit configured to increase an output of a cooling device, when the determination unit determines that the maximum possible torque for regeneration is smaller than the predetermined regeneration stopping threshold value, the increase in output being the difference between the maximum possible torque for regeneration and the predetermined regeneration stopping threshold value.

7. A drive control device for an electric vehicle according to claim 5, further comprising:
   a cooling control unit configured to increase an output of a cooling device, when the determination unit determines that the maximum possible torque for regeneration is smaller than the predetermined regeneration stopping threshold value, until the maximum possible torque for regeneration becomes greater than or equal to the predetermined regeneration stopping threshold value.

8. A drive control device for an electric vehicle according to claim 1,
   wherein when a brake pedal is depressed, the predetermined regeneration stopping threshold value is set within a range of braking torque.

9. A drive control device for an electric vehicle according to claim 1,
   wherein when a depression amount of a brake pedal is greater than zero, braking torques are stored, and the predetermined regeneration stopping threshold value is set to a value of braking torque whose frequency of occurrence is high.

10. A drive control device for an electric vehicle according to claim 1, wherein when a depression amount of a brake pedal is greater than zero, braking torques and corresponding vehicle speeds are stored, and for each of the vehicle speeds, the predetermined regeneration stopping threshold value is set to a value of braking torque whose frequency of occurrence vehicle speed is high.

11. An electric vehicle, comprising:
control device according to claim 1.

* * * * *